US012670430B2

(12) United States Patent
Abelha Ferreira et al.

(10) Patent No.: US 12,670,430 B2
(45) Date of Patent: Jun. 30, 2026

(54) EDGE DATA DISTRIBUTION CLIQUES

(71) Applicant: EMC IP Holding Company LLC, Hopkinton, MA (US)

(72) Inventors: Paulo Abelha Ferreira, Rio de Janeiro (BR); Pablo Nascimento da Silva, Niterói (BR); Vinicius Michel Gottin, Rio de Janeiro (BR)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1044 days.

(21) Appl. No.: 17/333,200

(22) Filed: May 28, 2021

(65) Prior Publication Data

US 2022/0383184 A1    Dec. 1, 2022

(51) Int. Cl.
*G06N 20/00* (2019.01)
(52) U.S. Cl.
CPC .................................... *G06N 20/00* (2019.01)
(58) Field of Classification Search
CPC ............. G06N 20/00; G06N 5/01; G06N 7/01
See application file for complete search history.

(56) References Cited

U.S. PATENT DOCUMENTS

| | | | |
|---|---|---|---|
| 10,248,476 B2 | 4/2019 | Cairns | |
| 10,579,272 B2 | 3/2020 | Tremblay et al. | |
| 10,853,867 B1 | 12/2020 | Bulusu | |
| 11,138,520 B2 | 10/2021 | Ganti et al. | |
| 11,562,026 B1 | 1/2023 | Menon et al. | |
| 11,715,287 B2 | 8/2023 | Matveev | |

(Continued)

FOREIGN PATENT DOCUMENTS

| | | | | |
|---|---|---|---|---|
| EP | 3783952 A1 * | 2/2021 | ......... | G05B 19/4185 |
| WO | WO-2020115273 A1 * | 6/2020 | .......... | G06K 9/6257 |
| WO | 2020205655 A1 | 10/2020 | | |

OTHER PUBLICATIONS

Pacharaney, Utkarsha S., and Rajiv Kumar Gupta. "Clustering and compressive data gathering in wireless sensor network." Wireless Personal Communications 109.2 (2019): 1311-1331. (Year: 2019).*

(Continued)

*Primary Examiner* — Jennifer N Welch
*Assistant Examiner* — Megan Elizabeth Hwang
(74) *Attorney, Agent, or Firm* — Chamberlain, Hrdlicka, White, Williams & Aughtry; Aly Z. Dossa

(57) ABSTRACT

Techniques described herein relate to a method for model updating based on maximal cliques. The method may include transmitting, by a model coordinator, a probability distribution request signal to a plurality of edge nodes; receiving, by the model coordinator, a separate feature probability distribution from each of the plurality of edge nodes; executing, by the model coordinator, a maximal clique identification algorithm using the feature probability distributions to obtain a plurality of maximal cliques; selecting, by the model coordinator, a representative edge node from each of the plurality of maximal cliques to obtain a plurality of representative edge nodes; transmitting, by the model coordinator, a feature data request signal to each of the plurality of representative edge nodes; receiving, by the model coordinator, feature data from each of the plurality of representative edge nodes; and performing machine learning (ML) model training using a first portion of the feature data.

9 Claims, 4 Drawing Sheets

(56) References Cited

U.S. PATENT DOCUMENTS

| | | | |
|---|---|---|---|
| 2009/0195796 A1* | 8/2009 | Monga .................. | G06V 30/40 |
| | | | 358/1.9 |
| 2017/0140297 A1* | 5/2017 | Karumanchi ........ | G06Q 10/063 |
| 2018/0150724 A1* | 5/2018 | Brock ..................... | G06F 18/23 |
| 2021/0012225 A1 | 1/2021 | Sathya et al. | |
| 2023/0048920 A1 | 2/2023 | Bhose et al. | |

OTHER PUBLICATIONS

De Smet, Frank, et al. "Adaptive quality-based clustering of gene expression profiles." Bioinformatics 18.5 (2002): 735-746. (Year: 2001).*

Lin, Wei-Chao, et al. "Clustering-based undersampling in class-imbalanced data." Information Sciences 409 (2017): 17-26. (Year: 2017).*

Bagherjeiran, Abraham, Christoph F. Eick, and Ricardo Vilalta. "Adaptive clustering: Better representatives with reinforcement learning." Department of Computer Science, University of Houston, Houston (2005). (Year: 2005).*

Cao, Hung, et al. "Analytics everywhere: generating insights from the internet of things." Ieee Access 7 (2019): 71749-71769. (Year: 2019).*

Nelson, J., 2012. "Sketching and Streaming Algorithms for Processing Massive Data". XRDS: Crossroads, The ACM Magazine for Students, 19(1), pp. 14-19.

Wang, T., Zhu, J.Y., Torralba, A. and Efros, A.A., "Dataset Distillation". arXiv preprint arXiv:1811.10959. v3. Feb. 24, 2020.

Endres, D.M. and Schindelin, J.E., "A New Metric for Probability Distributions". IEEE Transactions on Information theory, vol. 49, No. 7, pp. 1858-1860, Jul. 2003 (3 pages).

K. Makino and T. Uno, "New Algorithms for Enumerating All Maximal Cliques", Scandinavian Workshop on Algorithm Theory, pp. 260-272, 2004 (12 pages).

Ang, Hock Hee, et al., Predictive Handling of Asynchronous Concept Drifts in Distributed Environments, IEEE Transactions on Knowledge and Data Engineering, pp. 2343-2355, 2012.

Berestizshevsky, Konstantin, and Guy Even, Dynamically Sacrificing Accuracy for Reduced Computation: Cascaded Inference Based on Softmax Confidence,unknown, pp. 1-12, 2019.

H. Brendan McMahan et al.; "Communication-Efficient Learning of Deep Networks from Decentralized Data"; Proceedings of the 20th International Conference on Artificial Intelligence and Statistics, Proceedings of Machine Learning Research (PMLR); vol. 54; pp. 1273-1282; 2017 (http://proceedings.mlr.press/v54/mcmahan17a.html).

A. P. Mohamed et al., Knowledge Distillation for Wireless Edge Learning, Knowledge Distillation for Wireless Edge Learning, IEEE Statistical Signal Processing Workshop (SSP), 600-604, Year: 2021.

J. Posner et al., Federated Learning in Vehicular Networks: Opportunities and Solutions, Federated Learning in Vehicular Networks: Opportunities and Solutions, IEEE Network, vol. 35, No. 2, 152-159, Year: 2021.

Liu, M. et al., Federated Learning Meets Natural Language Processing: A Survey, Federated Learning Meets Natural Language Processing: A Survey, Retrieved from http://arxiv.org/abs/2107.12603, 1-19, Year: 2021.

* cited by examiner

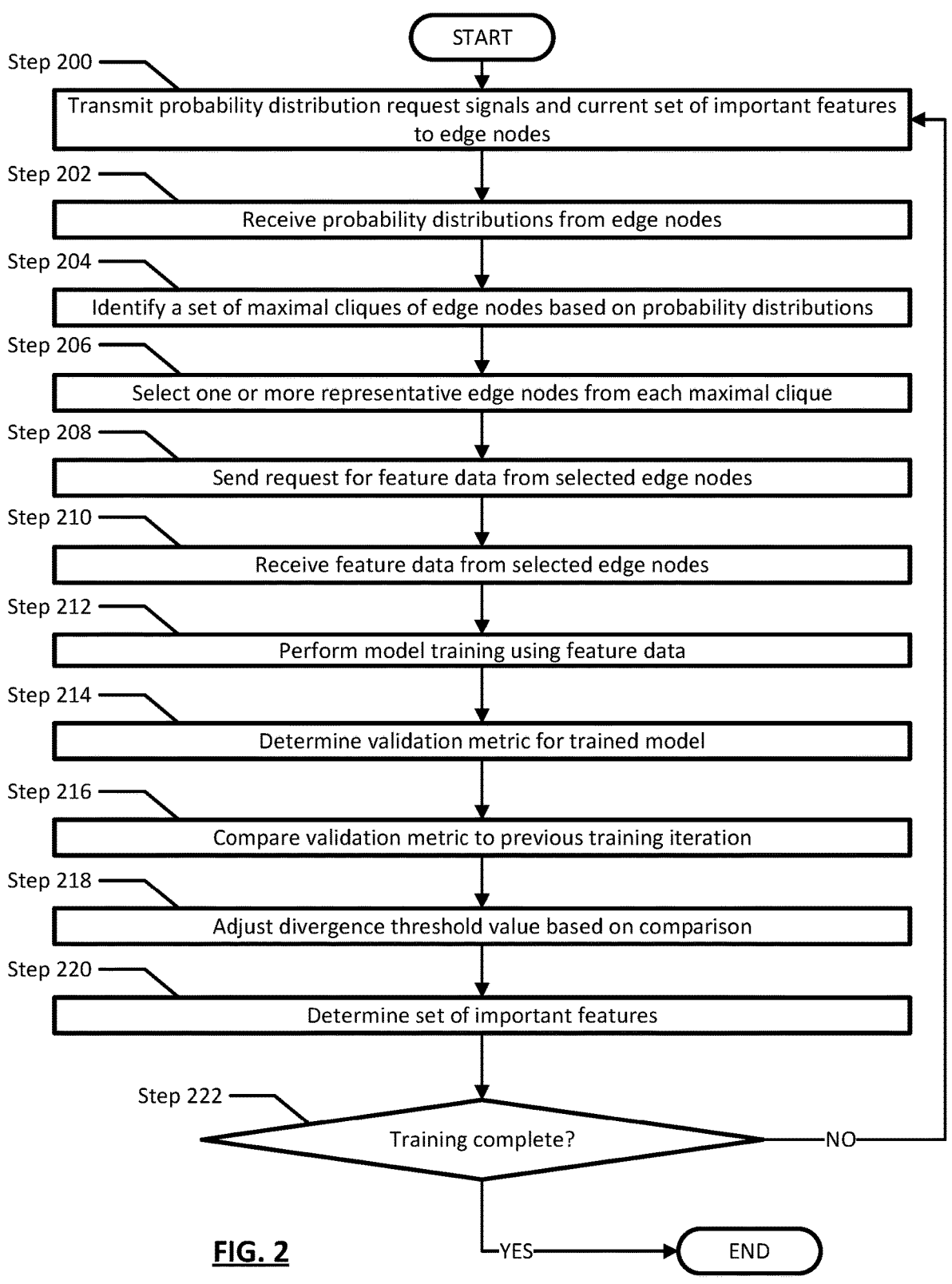

FIG. 2

START

Step 200 — Transmit probability distribution request signals and current set of important features to edge nodes Step 202 — Receive probability distributions from edge nodes Step 204 — Identify a set of maximal cliques of edge nodes based on probability distributions Step 206 — Select one or more representative edge nodes from each maximal clique Step 208 — Send request for feature data from selected edge nodes Step 210 — Receive feature data from selected edge nodes Step 212 — Perform model training using feature data Step 214 — Determine validation metric for trained model Step 216 — Compare validation metric to previous training iteration Step 218 — Adjust divergence threshold value based on comparison Step 220 — Determine set of important features Step 222 — Training complete?

NO

YES

END

300

EDGE DATA DISTRIBUTION CLIQUES

BACKGROUND

Computing devices often exist in environments that include many such devices (e.g., servers, virtualization environments, storage devices, mobile devices network devices, etc.). Machine learning algorithms may be deployed in such environments to, in part, assess data generated by or otherwise related to such computing devices. Such machine learning algorithms may be trained and/or executed on a central node, based on data generated by any number of edge nodes. Thus, data must be prepared and sent by the edge nodes to the central node. However, having edge nodes prepare and transmit data may use compute resources of the edge nodes and/or network resources that could otherwise be used for different purposes. Thus, it may be advantageous to employ techniques to minimize the work required of edge nodes and/or a network to provide data necessary to train and/or update a machine learning model on a central node.

SUMMARY

In general, embodiments described herein relate to a method for model updating based on maximal cliques. The method may include transmitting, by a model coordinator, a probability distribution request signal to a plurality of edge nodes; receiving, by the model coordinator, a separate feature probability distribution from each of the plurality of edge nodes; executing, by the model coordinator, a maximal clique identification algorithm using the feature probability distributions to obtain a plurality of maximal cliques; selecting, by the model coordinator, a representative edge node from each of the plurality of maximal cliques to obtain a plurality of representative edge nodes; transmitting, by the model coordinator, a feature data request signal to each of the plurality of representative edge nodes; receiving, by the model coordinator, feature data from each of the plurality of representative edge nodes; and performing machine learning (ML) model training using a first portion of the feature data.

In general, embodiments described herein relate to a non-transitory computer readable medium that includes computer readable program code, which when executed by a computer processor enables the computer processor to perform a method for model updating based on maximal cliques. The method may include transmitting, by a model coordinator, a probability distribution request signal to a plurality of edge nodes; receiving, by the model coordinator, a separate feature probability distribution from each of the plurality of edge nodes; executing, by the model coordinator, a maximal clique identification algorithm using the feature probability distributions to obtain a plurality of maximal cliques; selecting, by the model coordinator, a representative edge node from each of the plurality of maximal cliques to obtain a plurality of representative edge nodes; transmitting, by the model coordinator, a feature data request signal to each of the plurality of representative edge nodes; receiving, by the model coordinator, feature data from each of the plurality of representative edge nodes; and performing machine learning (ML) model training using a first portion of the feature data.

In general, embodiments described herein relate to a system for model updating based on maximal cliques. The system may include a model coordinator executing on a processor comprising circuitry. The model coordinator may be configured to transmit, by a model coordinator, a probability distribution request signal to a plurality of edge nodes; receive, by the model coordinator, a separate feature probability distribution from each of the plurality of edge nodes; execute, by the model coordinator, a maximal clique identification algorithm using the feature probability distributions to obtain a plurality of maximal cliques; select, by the model coordinator, a representative edge node from each of the plurality of maximal cliques to obtain a plurality of representative edge nodes; transmit, by the model coordinator, a feature data request signal to each of the plurality of representative edge nodes; receive, by the model coordinator, feature data from each of the plurality of representative edge nodes; and perform machine learning (ML) model training using a first portion of the feature data.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2 shows a flowchart in accordance with one or more embodiments of the invention.

DETAILED DESCRIPTION

Figure 1A:
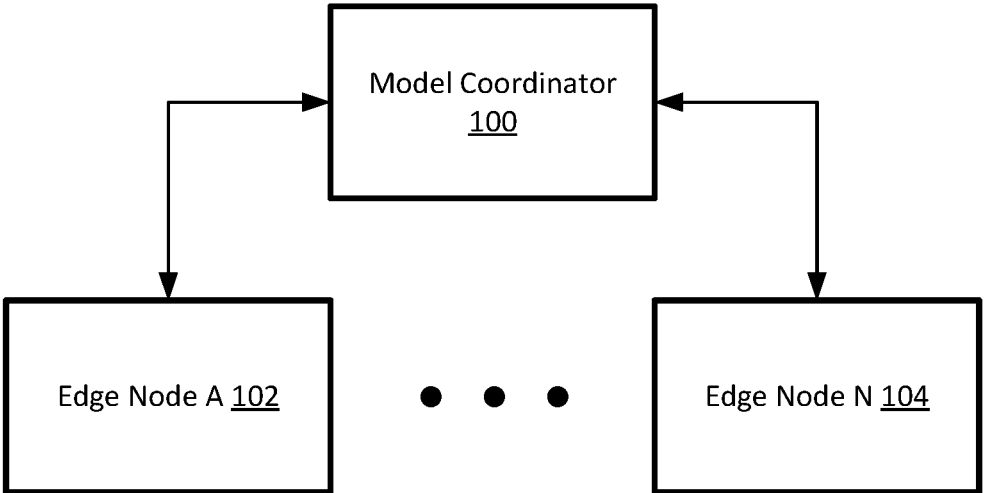
FIG. 1A shows a diagram of a system in accordance with one or more embodiments of the invention.

Specific embodiments will now be described with reference to the accompanying figures.

In the below description, numerous details are set forth as examples of embodiments described herein. It will be understood by those skilled in the art, that also have the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for training models (e.g., machine learning (ML) algorithms) at a central node using data from edge nodes. In one or more embodiments, when training a ML model at a central node using data from edge nodes, the edge nodes must keep sending new data to maintain a high accuracy and fresh model at the central node. However, the amount of data from each edge node may be large. As such, preparing such data for transmission may incur unwanted computation costs at the edge nodes, as well as unwanted network costs to actually transmit the data.

To address the aforementioned problems with training a ML model at a central node using data from edge nodes, embodiments described herein reduce the number of edge nodes from which data is transmitted. In one or more embodiments, the central node sends a signal to the edge nodes that causes the edge nodes to collect data related to one or more features. In one or more embodiments, a feature is any aspect of an edge node about which telemetry data may be collected over time. As an example, edge nodes may include storage devices, and features may be percentage of read operations in a given time window, percentage of write operations in a given time window, number of engines in the storage solution, storage model numbers, number of flash or spin disks, cache hits or misses, etc.

In one or more embodiments, in response to the signal the edge nodes use telemetry data related to one or more features to calculate probability distributions for each feature. Next, in one or more embodiments, the one or more probability distributions corresponding to the one or more features are transmitted from the edge nodes to the central node. In one or more embodiments, transmitting the probability distributions includes sending characteristics (e.g., mean and variance) of each probability distribution that allow the central node to reproduce and/or analyze the probability distribution.

In one or more embodiments, the central node then uses the probability distributions to execute a maximal clique identification algorithm that identifies one or more maximal cliques. In one or more embodiments, a maximal clique is a set of one or more edge nodes that have similar probability distributions for one or more features.

In one or more embodiments, the maximal clique identification algorithm includes determining the divergence (or distance) between probability distributions for one or more features from two edge nodes. Such divergence may be calculated using a bounded symmetric divergence metric (e.g. root square of the Jensen-Shannon divergence), for example, using Jensen-Shannon divergence, or the square root of Jensen-Shannon divergence, which may be referred to as distance between two probability distributions.

In one or more embodiments, if the divergence or distance between two probability distributions is equal to or less than a divergence threshold value, then the two edge nodes from which the probability distributions were received may be considered as part of the same maximal clique. In one or more embodiments, determining if two edge nodes are in the same maximal clique uses the divergence or distance derived from probability distributions related to one feature. In other embodiments, the divergence or distance may be an aggregate metric calculated using probability distributions of two or more features.

In one or more embodiments, the divergence threshold value is initially an empirically determined value that may be provided to the central node, and may be adjusted over time based on validation results of iterations of training the ML model. In one or more embodiments, the divergence threshold value may be any value zero or greater. For example, the divergence threshold value may be a value between zero and one. In such an example, the divergence or distance between one or more probability distributions of two edge nodes may be normalized to also be between zero and one to facilitate the comparison of the divergence or distance metric to the divergence threshold value.

In one or more embodiments, if two edge nodes are found to be in the same maximal clique, then the edge nodes are considered to be symmetrically similar Said another way, if edge node A has a similar data distribution to edge node B, then edge node B has a similar data distribution to edge node A.

In one or more embodiments, the maximal clique identification algorithm compares a given edge node with each other edge node using probability distributions and the divergence threshold value. In one or more embodiments, if the edge nodes are determined to be similar, then they are identified as being in the same maximal clique. In one or more embodiments, at the end of the first iteration of the maximal clique identification algorithm, the original edge node against which the other edge nodes were compared, and all of the compared edge nodes that were found to be similar, are in the same maximal clique, and removed from consideration for future comparisons. In one or more embodiments, the analysis is then continued by starting with an edge node that was not in the identified maximal clique, and comparing it to each other such edge node to identify another maximal clique. In one or more embodiments, the maximal clique identification algorithm is continued until all edge nodes have been grouped into maximal cliques of one or more edge nodes.

In one or more embodiments, the order of the processing of edge nodes is stored as metadata so that processing of edge nodes during execution of the maximal clique identification algorithm for future cycles of the ML training techniques described herein may be varied to help ensure that the edge nodes are not processed in the same order each iteration to avoid edge cases where identified cliques are not maximal cliques. For example, if edge node B is determined to be similar to edge node A, at the end of the first iteration, edge node B is not compared further with the other nodes, which may actually be more similar Randomizing or otherwise varying the order of edge node processing in different ML model training cycles may mitigate the impact of such potential situations.

In one or more embodiments, once the central node has identified the maximal cliques of edge nodes, the central node selects one or more representative edge node(s) from each maximal clique. The representative edge node(s) may be selected using any scheme for selecting one or more items from a larger group. As an example, the one or more edge nodes may be selected randomly, at least for the first cycle of the ML training techniques described herein. In one or more embodiments, future ML model training cycles may use any technique to select different sets of one or more nodes from identified maximal cliques, which may improve training of the ML algorithm.

In one or more embodiments, once the one or more representative nodes from the maximal cliques are selected by the central node, the central node sends each representative node a request for feature data. In one or more embodiments, in response to the request for feature data, each representative node sends the actual data corresponding to the one or more features to the central node. Thus, in one or more embodiments, instead of all edge nodes preparing and sending data, only a subset of one or more nodes (i.e., the representative nodes) from each identified maximal clique prepares and sends feature data to the central node. As such, the burden on the edge nodes and the network related to preparation and transmission of feature data is reduced.

In one or more embodiments, after receiving the feature data from the representative edge nodes, the feature data is used by the central node for ML training and validation. The particular ML model being trained and validated may be any ML model intended to produce any result based on feature data input. As an example, the features may be features of storage devices at the edge nodes, and the ML model may be designed to identify storage characteristics of edge nodes needed to achieve desired read and write operation response times.

In one or more embodiments, once the ML model is trained at the central node using a portion of the feature data from the representative edge nodes, another portion of the feature data is used by the central node to obtain a validation metric for the trained ML model. The validation metric may be obtained using any scheme for validating a ML model using validation data. In one or more embodiments, the validation metric represents a measure of the performance of the ML model. As an example, the validation metric may be a measure of classification accuracy.

In one or more embodiments, the validation metric is then stored, along with metadata associated with the current cycle of ML model training, such as an identifier of the current ML training cycle, identifiers of the representative edge nodes from which feature data was received, etc.

In one or more embodiments, the central node may then use the ML model for its intended purpose. As an example, the ML model may be used to determine recommendations for appropriately sized storage solutions based on a given customer's desired read and write operation response time. Alternatively, the ML model may not be used until a certain number of training cycles have been completed.

In one or more embodiments, a new training cycle for the ML model is performed using any relevant trigger for a new training cycle. For example, the central node may maintain a clock, and initiate a new training cycle after a specified amount of time has passed. In one or more embodiments, for a new training cycle, the central node again sends a signal to the edge nodes to collect data about features, uses the data to calculate probability distributions for the features, and transmits the probability distributions to the central node.

In one or more embodiments, for the first ML model training cycle, the signal may indicate that the edge nodes should calculate and send probability distributions for a set of all features that are potentially relevant to the ML model being trained. For future cycles of training, the signal may indicate that the edge nodes should calculate and send the probability distributions for only a subset of the features. Such a subset may be determined by the central node based on the ML model training. For example, the ML model may be a model (e.g., random forest) that produces weighted importance of feature values, and for future cycles, only features having a weight over a weight threshold may be requested. As another example, the ML model may not produce a measure of feature importance, and other techniques (e.g., Fisher Score, Information Gain, etc.) may be used to derive relative feature importance.

In one or more embodiments, for additional ML model training cycles, the central node may again identify maximal cliques of edge nodes using a maximal clique identification algorithm, select one or more representative edge nodes from the identified maximal cliques, request and receive feature data from the selected representative nodes, perform ML model training using the feature data, and obtain a validation metric for the trained ML model. In one or more embodiments, the validation metric for a cycle after the first cycle is compared with the validation metric from the previous cycle of ML model training, and the divergence threshold value may be adjusted based on the comparison.

In one or more embodiments, if the validation metric indicates that the model is performing less well than the model trained during the previous cycle, the divergence threshold value may be lowered. In one or more embodiments, lowering the divergence threshold value has the effect of making it harder for two edge nodes to be determined as similar based on analysis of one or more probability distributions from the edge nodes, thereby increasing the number of maximal cliques and, correspondingly, the number of representative nodes from which actual feature data is obtained for future training cycles. In one or more embodiments, increasing the number of edge nodes that prepare and send feature data to the central node provides a greater diversity of data on which to train the ML model, which may improve the performance of the ML model.

In one or more embodiments, if the validation metric indicates that the model is performing better than the model trained during the previous cycle, the divergence threshold value may be raised. In one or more embodiments, raising the divergence threshold value has the effect of making it easier for two edge nodes to be determined as similar based on analysis of one or more probability distributions from the edge nodes, thereby potentially decreasing the number of maximal cliques and, correspondingly, the number of representative nodes from which actual feature data is obtained for future training cycles. In one or more embodiments, reducing the number of edge nodes that prepare and send feature data to the central node further reduces the cost to the edge nodes and network of preparing and transmitting the feature data.

In one or more embodiments, the above-described process continues for as long as the ML model training occurs.

FIG. 1A shows a diagram of a system in accordance with one or more embodiments described herein. The system may include a model coordinator (100) operatively connected to any number of edge nodes (e.g., edge node A (102), edge node N (104)). Each of these components is described below.

In one or more embodiments, the edge nodes (102, 104) may be computing devices. In one or more embodiments, as used herein, an edge node (102, 104) is any computing device, collection of computing devices, portion of one or more computing devices, or any other logical grouping of computing resources.

In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, an enterprise data storage array etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device or edge node (102, 104). Other types of computing devices may be used as edge nodes without departing from the scope of embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, an edge node (102, 104) includes functionality to generate or otherwise obtain any amount or type of telemetry feature data that is related to the operation of the edge device. As used herein, a feature refers to any aspect of an edge device for which telemetry data may be recorded over time. For example, a storage array edge device may include functionality to obtain feature data related to data storage, such as read response time, write response time, number and/or type of disks (e.g., solid state, spinning disks, etc.), model number(s), number of storage engines, cache read/writes and/or hits/misses, size of reads/writes in megabytes, etc.

In one or more embodiments, an edge node includes enough resources to use such telemetry feature data to calculate probability distributions for any or all features. In one or more embodiments, a probability distribution is a mathematical function that describes the probabilities that a variable will have values within a given range. In one or more embodiments, a probability distribution may be represented, for example, by probability distribution characteristics, such as mean and variance.

In one or more embodiments, the system also includes a model coordinator (100). In one or more embodiments, the model coordinator (100) is operatively connected to the edge nodes (102, 104). A model coordinator (100) may be separate from and connected to any number of edge nodes (102, 104). In one or more embodiments, the model coordinator (100) is a computing device (described above). The model coordinator (100), and components therein, are discussed further in the description of FIG. 1B, below.

In one or more embodiments, the edge nodes (102, 104) and the model coordinator (100) are operatively connected via a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1A shows a configuration of components, other configurations may be used without departing from the scope of embodiments described herein. Accordingly, embodiments disclosed herein should not be limited to the configuration of components shown in FIG. 1A.

Figure 1B:
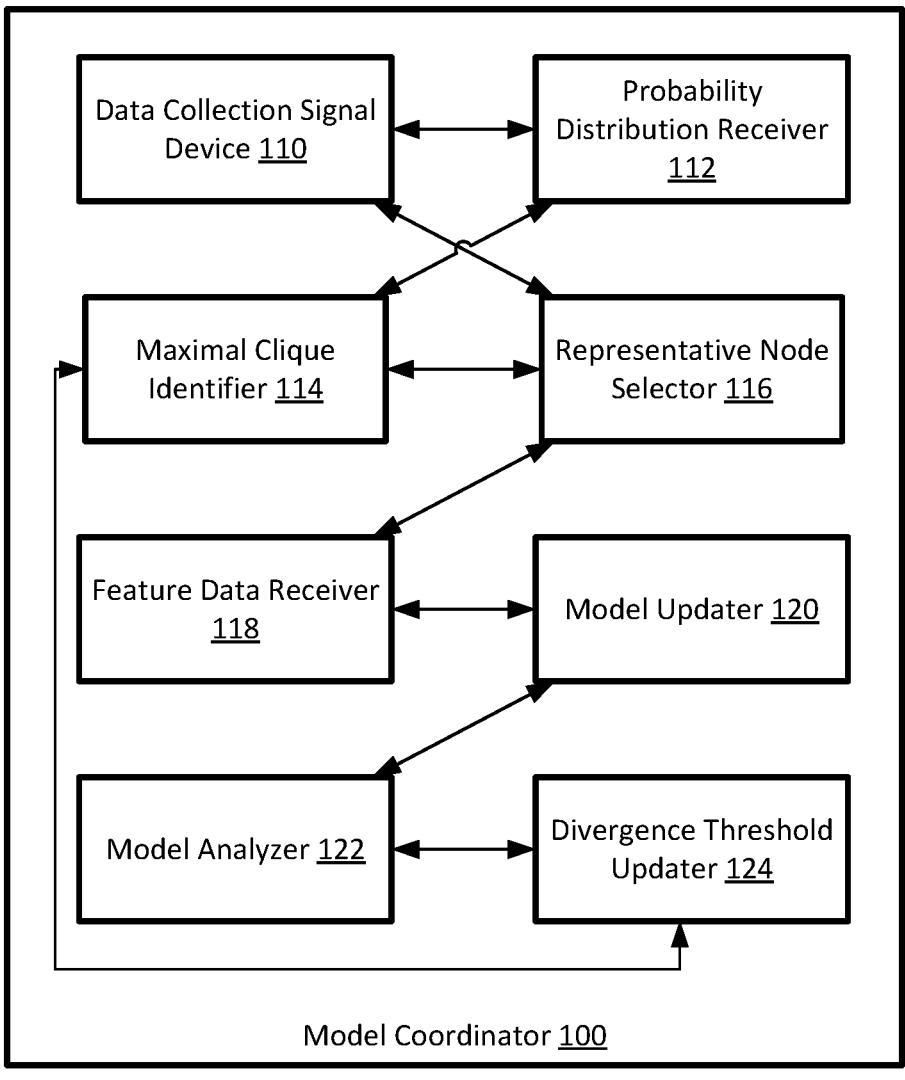
FIG. 1B shows a diagram of a model coordinator in accordance with one or more embodiments of the invention.

FIG. 1B shows an example diagram of a model coordinator (100) in accordance with one or more embodiments described herein. The model coordinator (100) may include any number of components. As shown in FIG. 1B, the model coordinator (100) includes a data collection signal device (110), a probability distribution receiver (112), a maximal clique identifier (114), a representative node selector (116), a feature data receiver (118), a model updater (120), a model analyzer (122), and a divergence threshold updater (124). Each of these components is described below.

In one or more embodiments, a model coordinator (100) is a computing device, as discussed above in the description of FIG. 1A.

In one or more embodiments, the model coordinator (100) includes a data collection signal device (110). In one or more embodiments, a data collection signal device (110) is any hardware (e.g., circuitry), software, firmware, or any combination thereof that includes functionality to transmit signals to one or more edge devices requesting information. In one or more embodiments, such requests include a request for an edge devices to generate and send to the model coordinator (100) one or more probability distributions, each corresponding to one or more features. Such a signal may be referred to as a probability distribution request. In one or more embodiments, the signal specifies the features for which a probability distribution is requested. In one or more embodiments, the signal is sent to representative edge nodes selected by the model coordinator (100), and requests feature data for one or more features from the representative edge nodes. In one or more embodiments, the probability distribution request signal is sent periodically to the edge nodes. The timing of the probability distribution request signal may be a set interval, and/or may vary over time. As an example, the probability distribution request signal may be sent daily, be set at times when the edge nodes are likely to or known to be experiencing a lighter workload, etc.

In one or more embodiments, the model coordinator (100) includes a probability distribution receiver (112). In one or more embodiments, a probability distribution receiver (112) is any hardware (e.g., circuitry), software, firmware, or any combination thereof that includes functionality to obtain/ receive probability distributions for one or more features from one or more edge nodes. In one or more embodiments, probability distributions are received in any manner capable of collecting data from or about computing devices (e.g., via, at least in part, one or more network interfaces of the model coordinator (100)).

In one or more embodiments, probability distributions are received as a set of characteristics of a mathematical function that describes the probability distribution, such as, for example, a mean and a variance for a probability distribution. In one or more embodiments, the probability distribution receiver (112) has access to a listing of the edge nodes from which one or more probability distributions are to be received, against which it can validate receipt of such probability distributions.

In one or more embodiments, a waiting time is defined for the one or more probability distributions. In one or more embodiments, if the one or more probability distributions from a given edge node are not received within the waiting time, then the probability distribution receiver (112) may request that the operatively connected data collection signal device (110) re-send the probability distribution request signal to the edge node. Additionally or alternatively, if the one or more requested probability distributions from a given edge node are not received after one or more defined waiting periods, the edge node may be skipped for the current cycle of ML model training.

In one or more embodiments, the model coordinator (100) includes a maximal clique identifier (114). In one or more embodiments, the maximal clique identifier (114) is operatively connected to the probability distribution receiver (112). In one or more embodiments, a maximal clique identifier (114) is any hardware (e.g., circuitry), software, firmware, or any combination thereof that includes functionality to use probability distributions received from one or more edge nodes to identify one or more maximal cliques, each having one or more edge nodes. In one or more embodiments, a maximal clique is a set of edge devices that are determined to be similar based on an analysis of probability distribution(s) of one or more features.

In one or more embodiments, such an analysis includes determining, for two edge nodes, a divergence value based on the probability distributions, and comparing the divergence value to a divergence value threshold. In one or more embodiments, if the divergence value found between two edge nodes is equal to or below the divergence value threshold, then the nodes are placed in the same maximal clique. In one or more embodiments, if the divergence value for two edge nodes is above the divergence value threshold, then the two edge nodes are not in the same maximal clique. Any method of calculating a divergence value for one or more probability distributions from two edge nodes may be used without departing from the scope of embodiments described herein.

As an example, the maximal clique identifier (114) of the model coordinator (100) may compare edge nodes using a bounded symmetric divergence metric, such as Jensen-Shannon divergence. As another example, the maximal clique identifier (114) may use the square root of the Jensen-Shannon divergence to identify a distance metric, which may be considered a divergence value as used herein. In one or more embodiments, the final divergence value may be obtained using probability distributions for one or more features, or may be calculated as the average divergence across all features being considered, with such averaging maintaining distance metric properties. The iterative algorithm for identifying maximal cliques is discussed further in the description of FIG. 2, below.

In one or more embodiments, the model coordinator (100) includes a representative node selector (116). In one or more embodiments, the representative node selector (116) is operatively connected to the maximal clique identifier (114) and the data collection signal device (110). In one or more embodiments, the representative node selector (116) is any hardware (e.g., circuitry), software, firmware, or any combination thereof that includes functionality to select one or more representative edge nodes from each maximal clique identified by the maximal clique identifier (114). In one or more embodiments, representative node selector (116) selects one or more representative edge nodes from the maximal cliques using any scheme for selecting one or more items from a larger group of such items.

As an example, the one or more edge nodes may be selected randomly, at least for the first cycle of the ML training techniques described herein. Other techniques for selecting representative edge nodes (e.g., a round robin scheme) may be used without departing from the scope of embodiments described herein. In one or more embodiments, future ML model training cycles may use any technique to select different sets of one or more nodes from identified maximal cliques, which may improve training of the ML algorithm.

In one or more embodiments, the representative node selector (116) of the model coordinator (100) uses the maximal cliques to decide which edge node(s) will send their respective data. The representative node selector (116) then selects a (or a single) edge node to represent its maximal clique by sending feature data to the model coordinator (100). Similarly, as in the collection of the probability distributions, in one or more embodiments, mechanisms for accounting for excessive delay or unavailability of edge nodes may be defined based on the environment and the domain. In one or more embodiments, an example of such a mechanism is to determine a maximum waiting time for the collection of the data from a representative edge node. In one or more embodiments, if the time limit is exhausted and the feature data is not received, the representative node selector (116) may change its selection of the representative edge node for the clique from which feature data was not received.

In one or more embodiments, the representative node selector (116) includes functionality to request the operatively connected data collection signal device (110) to send a feature data collection request signal to the selected edge nodes.

In one or more embodiments, the model coordinator (100) includes a feature data receiver (118). In one or more embodiments, a feature data receiver (118) is operatively connected to the representative node selector (116), and thereby has access to a listing of representative edge nodes selected from the maximal cliques. In one or more embodiments, the representative node selector (116) is any hardware (e.g., circuitry), software, firmware, or any combination thereof that includes functionality to receive feature data from the representative edge nodes. In one or more embodiments, feature data is received in any manner capable of collecting data from or about computing devices (e.g., via, at least in part, one or more network interfaces of the model coordinator (100)).

In one or more embodiments, the model coordinator (100) includes a model updater (120) operatively connected to the feature data receiver (118) and the probability distribution receiver (112). In one or more embodiments, a model updater (120) is any hardware (e.g., circuitry), software, firmware, or any combination thereof that includes functionality to use feature data received via the feature data receiver (118) to train and validate a ML model during a training cycle. The ML model being trained and validated may be any ML model without departing from the scope of embodiments described herein, and may be intended for any relevant purpose (e.g., classification, inference, identification, storage solution sizing, etc.).

In one or more embodiments, the model coordinator (100) includes a model analyzer (122) operatively connected to the model updater (120). In one or more embodiments, a model analyzer (122) is any hardware (e.g., circuitry), software, firmware, or any combination thereof that includes functionality to analyze the ML model trained by the model updater (120) to obtain any relevant type of information. In one or more embodiments, one such type of information is an initial or updated list of important features.

In one or more embodiments, an important feature is a feature (described above) of an edge node that is particularly relevant (i.e., has an impact on the training of the ML model). In one or more embodiments, important/relevant features are derived using the ML model training itself, for ML models that inherently provide feature importance. As an example, a random forest algorithm ML model produces a weighted ranking of features, and features having a weight over a feature importance threshold may be deemed as important features. As another example, the model analyzer (122) may use other techniques, such as Fisher Score, Importance Gain, etc. to determine a set of one or more relevant features. In one or more embodiments, the relevant features identified by the model analyzer (122) may be used when requesting probability distributions and/or feature data from edge nodes in future training cycles, which may further reduce the amount of data that must be prepared and transmitted by the edge nodes to facilitate ML model training in embodiments described herein.

In one or more embodiments, the model analyzer (122) also includes functionality to use the validation results for the ML model trained during the current training cycle to compare against the validation results from a previous cycle of ML model training. In one or more embodiments, such a comparison may determine if the ML model trained during the current cycle performs better or worse than the ML model trained during the previous cycle.

In one or more embodiments, the model coordinator (100) includes a divergence threshold updater (124). In one or more embodiments, the divergence threshold updater (124) is operatively connected to the model analyzer (122) and the maximal clique identifier (114). In one or more embodiments, the divergence threshold updater (124) is any hardware (e.g., circuitry), software, firmware, or any combination thereof that includes functionality to update the divergence threshold value that is used for maximal clique identification. In one or more embodiments, the divergence threshold updater (124) uses the results of the comparison performed by the model analyzer (122) of the validation results of the current ML training cycle and the validation results of a previous ML model training cycle to update the divergence threshold value for use in the next ML model training cycle. In one or more embodiments, if the model is performing worse than the previous model, then the divergence threshold value may be reduced, thereby forcing edge nodes to be more similar to be determined as in the same maximal clique, which may increase the number of maximal cliques and, by extension, the number of representative nodes from which feature data is received for ML model training in the next cycle. In one or more embodiments, if the model is performing better than the previous model, then the divergence threshold value may be increased, thereby relaxing the similarity standard for edge nodes to be determined as in the same maximal clique, which may decrease the number of maximal cliques and, by extension, the number of representative nodes from which feature data is received for ML model training in the next cycle. In one or more embodiments, the divergence threshold updater (124) is configured to provide updated divergence threshold values to the maximal clique identifier (114) for use in identifying maximal cliques in the next ML model training cycle.

While FIG. 1B shows a configuration of components, other configurations may be used without departing from the scope of embodiments described herein. For example, although FIG. 1B shows all components as part of the same device, any of the components may be grouped in sets of one or more components which may exist and execute as part of any number of separate and operatively connected devices. As another example, a single component may be configured to perform all or any portion of any of the functionality performed by the components shown in FIG. 1B. Accordingly, embodiments disclosed herein should not be limited to the configuration of components shown in FIG. 1B.

FIG. 2 shows a flowchart describing a method for ML model training using edge nodes selected from maximal cliques in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 2.

In Step 200, probability distribution request signals are transmitted to edge nodes. In one or more embodiments, probability distribution request signals are transmitted to edge nodes from a model coordinator. A probability distribution request node may be transmitted to an edge node using any scheme for sending information from one device to another device. As an example, probability distribution request signals may be transmitted via a network. In one or more embodiments, a probability distribution request signal may include an indication of the features of an edge device for which a probability distribution is requested. As an example, an initial probability distribution request signal may request a probability distribution for all features potentially relevant to training of an ML model, while subsequent probability distribution request signals may include a subset of such features, with the subset determined based at least in part on the execution of a ML model training cycle.

In Step 202, probability distributions are received from one or more edge nodes. In one or more embodiments, the probability distributions are received at a model coordinator. In one or more embodiments, if one or more probability distributions are not received from a given one or more edge nodes within a pre-defined waiting period, an additional request may be sent to the edge nodes. Additionally or alternatively, edge nodes from which probability distributions are not received within the waiting period may be excluded from the current ML model training cycle.

In Step 204, a set of maximal cliques is identified based at least in part on the probability distributions received in Step 202. In one or more embodiments, the identification of maximal cliques is performed by a model coordinator executing a maximal clique identification algorithm. In one or more embodiments, a maximal clique identification algorithm is any suitable algorithm that can be used to determine a divergence value between two edge nodes based on one or more probability distributions from each edge node, and can be iterated to place all edge nodes from which one or more probability distributions were received into maximal cliques of one or more edge nodes.

In one or more embodiments, a divergence value is calculated using a bounded symmetric divergence metric (e.g., root square of the Jensen-Shannon divergence). In one or more embodiments, a distance value may be considered as a divergence value, and may be calculated using the square root of the Jensen-Shannon divergence. In one or more embodiments, a divergence value between two edge nodes is calculated using the one or more probability distributions from each of the two edge nodes. In one or more embodiments, the divergence value is calculated using probability distributions corresponding to the same feature. As an example, if probability distributions for read response time are received from edge nodes, then the probability distributions for read response time from two edge nodes are used to calculate a divergence value. In one or more embodiments, if there are more than one probability distributions from the edge nodes, a divergence value between two edge nodes may be calculated for each feature, and the results may be averaged to determine a final divergence value for the two edge nodes. In one or more embodiments, if there are more than one probability distributions from the edge nodes, a divergence value between two edge nodes may be calculated for each feature, and the results may be weighted based on feature importance, and then combined to determine a final divergence value for the two edge nodes.

In one or more embodiments, maximal cliques are identified using an iterative algorithm to calculate the aforementioned divergence values for pairs of edge nodes. In such an algorithm, an edge node may be selected, and a divergence value may be calculated using the probability distribution(s) from that edge node, and each other edge node from which probability distributions were received.

In one or more embodiments, the edge node selected to start the algorithm is removed from any future comparisons after a divergence value is calculated between it and each other edge node from which probability distributions were received. In one or more embodiments, each other edge node for which the calculated divergence value from the initial edge node was equal to or less than a divergence threshold value is determined to be in the same maximal clique as the initial edge node, and is also removed from future comparisons, as those nodes are already in a maximal clique. In one or more embodiments, each other edge node that was determined to have a divergence value with respect to the initial node that is higher than the divergence value threshold, and therefore is not in the same maximal clique as the initial edge node, are used in future iterations of the maximal clique identification algorithm.

In one or more embodiments, for the second iteration, an edge node is selected from among the set of edge nodes that were not added to a maximal clique during the previous iteration, and the process is repeated by finding divergence values for that node compared with each other node in the set of edge nodes not already in a maximal clique. At the end of the second iteration, a second maximal clique has been identified. In one or more embodiments, the algorithm continues in this way for as many iterations as are needed to place each edge node in a maximal clique. In one or more embodiments, the selection of edge nodes to start the maximal clique identification algorithm iterations may be varied per ML model training cycle (i.e., the same edge nodes are not used as the initial edge nodes for the algorithm iterations).

In Step 206, one or more representative edge nodes are selected from each maximal clique identified in Step 204. In one or more embodiments, the one or more representative edge nodes are selected by a model coordinator. In one or more embodiments, the one or more representative nodes are selected using any scheme for selecting one item from a group of items (e.g., randomly, round-robin, etc.)

In Step 208, a request for feature data is sent to the representative edge nodes selected in Step 206. Such a request may be referred to as a feature data request signal. In one or more embodiments, the feature data request signal is transmitted to the representative edge nodes by a model coordinator. In one or more embodiments, a feature data request signal includes an indication of the features for which data is requested, which may be based, at least in part, on feature importance or relevance as determined as part of the previous ML model training cycle.

In Step 210, feature data is received from the selected representative edge nodes. In one or more embodiments, the feature data is received by a model coordinator. The feature data may be received from the edge nodes using any scheme for transmitting information from one device to another device. For example, the feature data may be received via a network.

In Step 212, the feature data received in Step 210 is used to train the ML model. Any ML model may be trained using the feature data without departing from the scope of embodiments described herein.

In Step 214, a portion of the feature data is used to perform a validation of the ML model trained in Step 212 to obtain a validation metric for the ML model training cycle. In one or more embodiments, the validation metric is stored along with relevant metadata. In one or more embodiments, such metadata includes, but is not limited to, an identifier of the training cycle, identifiers of the representative edge nodes, and/or any other relevant information that may be used for future training cycles.

In Step 216, the validation metric for the training cycle is compared to a validation metric from a previous training cycle. For a first training cycle, the validation metric may be compared with a pre-determined validation metric that indicates a desired level of performance of the ML model. For subsequent training cycles, the validation metric may be compared with the validation metric from the training cycle.

In Step 218, the divergence threshold value is adjusted based on the validation metric comparison of Step 216. In one or more embodiments, if the validation metric for the current training cycle indicates that the ML model trained in the current cycle performs worse than a previous cycle, then the divergence threshold value may be lowered. In one or more embodiments, lowering the divergence threshold value results in potentially more maximal cliques, and feature data being received from more representative edge nodes. In one or more embodiments, if the validation metric for the current training cycle indicates that the ML model trained in the current cycle performs better than a previous cycle, then the divergence threshold value may be raised. In one or more embodiments, raising the divergence threshold value results in potentially less maximal cliques, and feature data being received from fewer representative edge nodes. In one or more embodiments, the updated divergence threshold value is stored for use in maximal clique identification during the next ML model training cycle.

In Step 220, a set of features that are important or relevant for the ML model is determined. In one or more embodiments, important features are determined based on the ML model, which may inherently rank features used in the training, such as a random forest algorithm. In one or more embodiments, if the ML model does not inherently determine feature importance, then any other technique may be used to derive feature importance, such as, for example, Fisher Score, or Information Gain. In one or more embodiments, the features are weighted, and compared against a threshold to determine if they are important features. In one or more embodiments, the set of important features are stored with the results of the ML model training cycle, and used during execution of the next training cycle. For example, the important features may be used to determine the features for which probability distributions and/or feature data are requested during the next training cycle.

In Step 222, a determination is made as to whether the training of the ML model is complete. In one or more embodiments, if the training is to continue, the method returns to Step 200. In one or more embodiments, if the training is complete, the method ends.

Example Use Case

The above describes systems and methods for training an ML model during any number of successive training cycles, where, for each cycle, probability distributions from edge nodes are used to identify maximal cliques from which representative nodes are selected to send feature data used in the training and validation of the ML model. As such, one of ordinary skill in the art will recognize that there are many variations of how such ML model training may occur, as is described above. However, for the sake of brevity and simplicity, consider the following simplified scenario to illustrate the concepts described herein.

A model coordinator is configured to perform ML model training for sizing storage solutions to achieve desired read response times. The model coordinator is operatively connected via a network to five edge nodes, A, B, C, D, and E. To begin training, the model coordinator sends probability distribution request signals to each edge node requesting a probability distribution for read response time over a five minute window, in addition to probability distributions for other storage-related features. In response, the model coordinator receives the requested probability distributions.

In one or more embodiments, the model coordinator uses the probability distributions to iteratively place the edge nodes into maximal cliques. First, edge node A is selected, and a divergence value is calculated between edge node A and edge node B. The divergence value is determined to be less than an initial divergence value threshold. Thus, edge node B is placed in the same maximal clique as edge node A.

Next, the model coordinator calculates a divergence value between edge node A and edge node C. The divergence value is determined to be greater that the initial divergence value threshold. Thus, edge node C is not in the maximal clique with edge nodes A and B.

Next, the model coordinator calculates a divergence value between edge node A and edge node D. The divergence value is determined to be less than the initial divergence value threshold. Thus, edge node D is included in the maximal clique with edge nodes A and B.

Next, the model coordinator calculates a divergence value between edge node A and edge node E. The divergence value is determined to be greater that the initial divergence value threshold. Thus, edge node E is not in the maximal clique with edge nodes A, B, and D.

Next, the model coordinator selects edge node C as the initial edge node for the second iteration. A divergence value is calculated between edge node C and edge node E, and found to be less than the initial divergence value threshold. Thus, edge node C and edge node E are in the same maximal clique.

At this point, two maximal cliques are identified. One includes edge nodes A, B, and D, and the other includes edge nodes C and E. The model coordinator then randomly selected edge node A from the first maximal clique, and edge node E from the second maximal clique. A feature data request signal is sent to edge node A and E requesting feature data for all features for which probability distributions were previously received.

Next, the model coordinator uses a portion of the feature data to train the ML model. Another portion of the feature data is used to obtain a validation metric for the trained ML model. The validation metric is compared to a desired validation metric value (because at this point, there is no previous cycle's validation metric against which to compare the current validation metric). The comparison determines that the validation metric indicates that the ML model is performing worse than desired. Therefore, the divergence value threshold is decreased for the next training cycle. Additionally, the results of the ML model training are used to determine that read response time and write response time are important features.

In the next training cycle, the model coordinator requests and receives probability distributions from only the important features, and uses the probability distributions, along with the updated divergence metric to identify maximal cliques, which results in more maximal cliques than in the first cycle (due to the decrease of the divergence value threshold). Therefore, feature data is received from more representative nodes, and used in the ML model training and validation. The process repeats until the training is determined to be complete.

Figure 3:
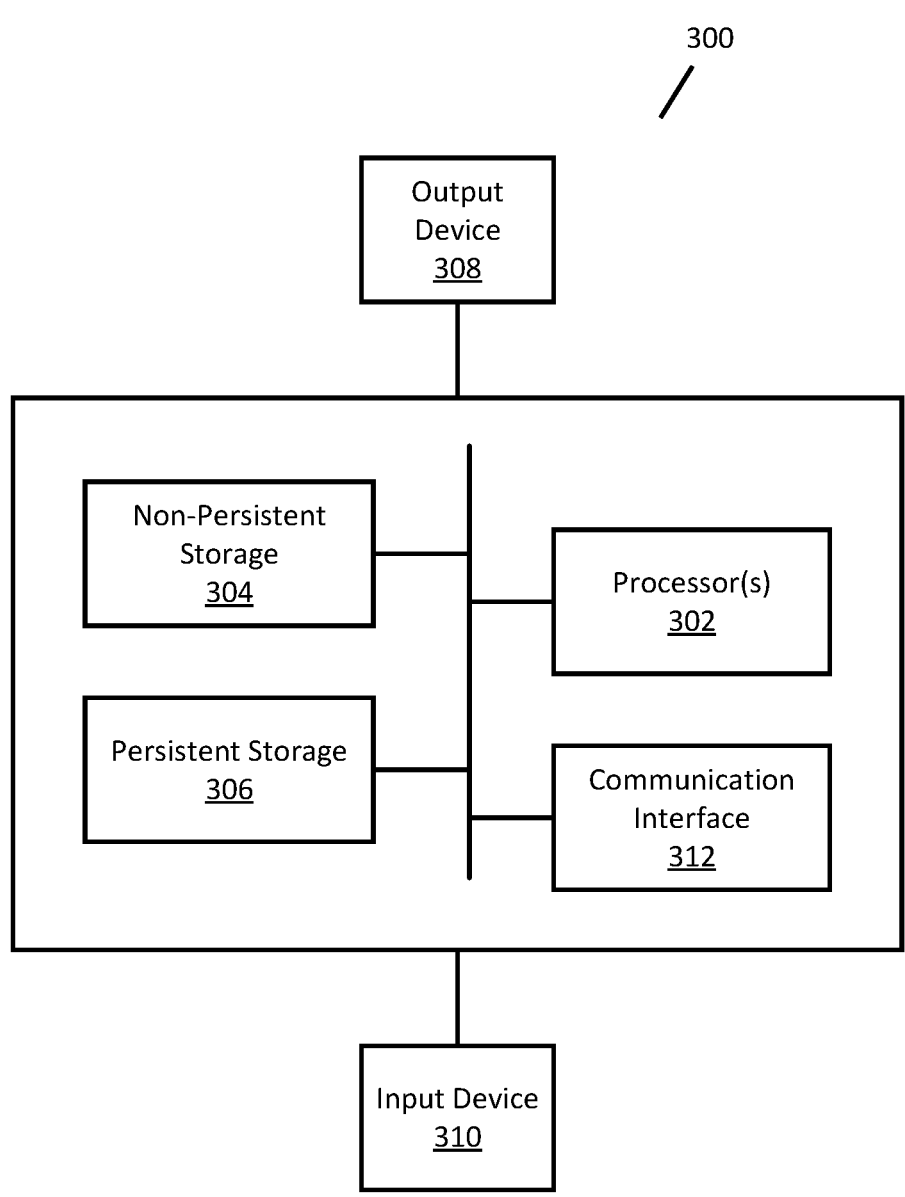
FIG. 3 shows a computing system in accordance with one or more embodiments of the invention.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for model updating based on maximal cliques, the method comprising:

transmitting, by a model coordinator, a probability distribution request signal to a plurality of edge nodes, wherein the plurality of edge nodes obtain telemetry feature data related to one or more features of an edge device specified in the probability distribution request signal and wherein the one or more features are a subset of features from a previous probability distribution request signal from a previous machine learning (ML) model training cycle;

receiving, by the model coordinator, a separate feature probability distribution from each of the plurality of edge nodes, wherein the separate feature probability distribution is calculated using the telemetry feature data;

executing, by the model coordinator, a maximal clique identification algorithm using the feature probability distributions to obtain a first plurality of maximal cliques, wherein:

a maximal clique of the first plurality of maximal cliques is a set of one or more edge nodes that have similar probability distributions for the one or more features, and the maximal clique identification algorithm comprises:

calculating a divergence value, based on the feature probability distributions, between two edge nodes of the plurality of edge nodes using a bounded symmetric divergence metric, comparing the divergence value with a divergence value threshold to obtain a result, and determining that the two edge nodes are in a maximal clique based on the result;

selecting, by the model coordinator, a representative edge node from each of the first plurality of maximal cliques to obtain a plurality of representative edge nodes, wherein a technique for selecting the representative edge node is a round robin scheme;

transmitting, by the model coordinator, a feature data request signal to each of the plurality of representative edge nodes, wherein the feature data request signal includes a type of feature requested based on the previous ML model training cycle;

receiving, by the model coordinator, feature data for the one or more features from each of the plurality of representative edge nodes;

performing ML model training on an ML model using a first portion of the feature data to obtain a trained ML model;

performing ML model validation, on the trained ML model, using a second portion of the feature data to obtain a current validation metric, wherein the current validation metric is stored in metadata along with other information relevant to a future ML model training cycle;

comparing the current validation metric to a previous validation metric from the previous ML model training cycle;

updating the divergence value threshold for the future ML model training cycle based on the comparison of the current validation metric and the previous validation metric to obtain an updated divergence value threshold, wherein the divergence value threshold is raised because the trained ML model performed better to the previous ML model training cycle;

identifying a set of important features for the future ML model training cycle using a random forest algorithm that inherently ranks the one or more features during training to further refine a set of features for the future ML model training cycle; and after the identifying, initiating further training of the trained ML model using the set of a set of important features for the future ML model training cycle, and the updated divergence value threshold, wherein the further training includes a second plurality of maximal cliques with a first amount of maximal cliques less than the first plurality of maximal cliques reducing an amount of data to train the ML model during the future ML model training cycle.

2. The method of claim 1, wherein a maximal clique of the first plurality of maximal cliques comprises a portion of the plurality of edge nodes.

3. The method of claim 1, wherein each of the plurality of edge nodes prepares and transmits the separate feature probability distribution to the model coordinator in response to receiving the probability distribution request signal.

4. A non-transitory computer readable medium comprising computer readable program code, which when executed by a computer processor enables the computer processor to perform a method for model updating based on maximal cliques, the method comprising:

transmitting, by a model coordinator, a probability distribution request signal to a plurality of edge nodes, wherein the plurality of edge nodes obtain telemetry feature data related to one or more features of an edge device specified in the probability distribution request signal and wherein the one or more features are a subset of features from a previous probability distribution request signal from a previous machine learning (ML) model training cycle;

receiving, by the model coordinator, a separate feature probability distribution from each of the plurality of edge nodes, wherein the separate feature probability distribution is calculated using the telemetry feature data;

executing, by the model coordinator, a maximal clique identification algorithm using the feature probability distributions to obtain a first plurality of maximal cliques, wherein:

a maximal clique of the first plurality of maximal cliques is a set of one or more edge nodes that have similar probability distributions for the one or more features, and the maximal clique identification algorithm comprises:

calculating a divergence value, based on the feature probability distributions, between two edge nodes of the plurality of edge nodes using a bounded symmetric divergence metric, comparing the divergence value with a divergence value threshold to obtain a result, and determining that the two edge nodes are in a maximal clique based on the result;

selecting, by the model coordinator, a representative edge node from each of the first plurality of maximal cliques to obtain a plurality of representative edge nodes, wherein a technique for selecting the representative edge node is a round robin scheme;

transmitting, by the model coordinator, a feature data request signal to each of the plurality of representative edge nodes, wherein the feature data request signal includes a type of feature requested based on the previous ML model training cycle;

receiving, by the model coordinator, feature data for the one or more features from each of the plurality of representative edge nodes;

performing ML model training on an ML model using a first portion of the feature data to obtain a trained ML model;

performing ML model validation, on the trained ML model, using a second portion of the feature data to obtain a current validation metric, wherein the current validation metric is stored in metadata along with other information relevant to a future ML model training cycle;

comparing the current validation metric to a previous validation metric from the previous ML model training cycle;

updating the divergence value threshold for the future ML model training cycle based on the comparison of the current validation metric and the previous validation metric to obtain an updated divergence value threshold, wherein the divergence value threshold is raised because the trained ML model performed better to the previous ML model training cycle;

identifying a set of important features for the future ML model training cycle using a random forest algorithm that inherently ranks the one or more features during training to further refine a set of features for the future ML model training cycle; and after the identifying, initiating further training of the trained ML model using the set of a set of important features for the future ML model training cycle, and the updated divergence value threshold, wherein the further training includes a second plurality of maximal cliques with a first amount of maximal cliques less than the first plurality of maximal cliques reducing an amount of data to train the ML model during the future ML model training cycle.

5. The non-transitory computer readable medium of claim 4, wherein a maximal clique of the first plurality of maximal cliques comprises a portion of the plurality of edge nodes.

6. The non-transitory computer readable medium of claim 4, wherein each of the plurality of edge nodes prepares and transmits the separate feature probability distribution of the model coordinator in response to receiving the probability distribution request signal.

7. A system for model updating based on maximal cliques, the system comprising:

a model coordinator, executing on a processor comprising circuitry, and configured to:

transmit, by a model coordinator, a probability distribution request signal to a plurality of edge nodes, wherein the plurality of edge nodes obtain telemetry feature data related to one or more features of an edge device specified in the probability distribution request signal and wherein the one or more features are a subset of features from a previous probability distribution request signal from a previous machine learning (ML) model training cycle;

receive, by the model coordinator, a separate feature probability distribution from each of the plurality of edge nodes, wherein the separate feature probability distribution is calculated using the telemetry feature data;

execute, by the model coordinator, a maximal clique identification algorithm using the feature probability distributions to obtain a first plurality of maximal cliques, wherein:

a maximal clique of the first plurality of maximal cliques is a set of one or more edge nodes that have similar probability distributions for the one or more features, and the maximal clique identification algorithm comprises:

calculating a divergence value, based on the feature probability distributions, between two edge nodes of the plurality of edge nodes using a bounded symmetric divergence metric, comparing the divergence value with a divergence value threshold to obtain a result, and determining that the two edge nodes are in a maximal clique based on the result;

select, by the model coordinator, a representative edge node from each of the first plurality of maximal cliques to obtain a plurality of representative edge nodes, wherein a technique for selecting the representative edge node is a round robin scheme;

transmit, by the model coordinator, a feature data request signal to each of the plurality of representative edge nodes, wherein the feature data request signal includes a type of feature requested based on the previous ML model training cycle;

receive, by the model coordinator, feature data for the one or more features from each of the plurality of representative edge nodes;

perform ML model training on an ML model using a first portion of the feature data to obtain a trained ML model;

perform ML model validation, on the trained ML model, using a second portion of the feature data to obtain a current validation metric, wherein the current validation metric is stored in metadata along with other information relevant to a future ML model training cycle;

compare the current validation metric to a previous validation metric from the previous ML model training cycle;

update the divergence value threshold for the future ML model training cycle based on the comparison of the current validation metric and the previous validation metric to obtain an updated divergence value threshold, wherein the divergence value threshold is raised because the trained ML model performed better to the previous ML model training cycle;

identify a set of important features for the future ML model training cycle using a random forest algorithm that inherently ranks the one or more features during training to further refine a set of features for the future ML model training cycle; and after the identifying, initiating further training of the trained ML model using the set of a set of important features for the future ML model training cycle, and the updated divergence value threshold, wherein the further training includes a second plurality of maximal cliques with a first amount of maximal cliques less than the first plurality of maximal cliques reducing an amount of data to train the ML model during the future ML model training cycle.

8. The system of claim 7, wherein a maximal clique of the first plurality of maximal cliques comprises a portion of the plurality of edge nodes.

9. The system of claim 7, wherein each of the plurality of edge nodes prepares and transmits the separate feature probability distribution to the model coordinator in response to receiving the probability distribution request signal.

* * * * *